(12) United States Patent
Choi et al.

(10) Patent No.: US 6,417,907 B2
(45) Date of Patent: Jul. 9, 2002

(54) IN-PLANE SWITCHING MODE LIQUID CRYSTAL DISPLAY PANEL

(75) Inventors: Suk Won Choi, Anyang-shi; Su Seok Choi, Hanam-shi, both of (KR)

(73) Assignee: LG. Philips LCD Co., LTD, Seoul (KR)

( * ) Notice: Subject to any disclaimer, the term of this patent is extended or adjusted under 35 U.S.C. 154(b) by 0 days.

(21) Appl. No.: 09/750,248

(22) Filed: Dec. 29, 2000

(30) Foreign Application Priority Data

Dec. 31, 1999 (KR) ............................................. 99-68075

(51) Int. Cl.[7] ........................ G02F 1/1337; G02F 1/141
(52) U.S. Cl. ........................ 349/141; 349/123; 349/133
(58) Field of Search ................................. 349/123, 127, 349/133, 135, 141, 178; 428/1

(56) References Cited

U.S. PATENT DOCUMENTS

| | | | | |
|---|---|---|---|---|
| 4,983,318 A | * | 1/1991 | Matsumoto et al. | ... 252/299.01 |
| 5,039,208 A | * | 8/1991 | Ohnishi et al. | .............. 349/123 |
| 5,119,221 A | * | 6/1992 | Nakajima et al. | ............ 349/123 |
| 5,258,134 A | * | 11/1993 | Yoshinaga et al. | ...... 252/299.01 |
| 5,745,629 A | * | 4/1998 | Sasaki | ......................... 359/332 |
| 5,925,423 A | * | 7/1999 | Han et al. | .................... 349/123 |
| 6,048,928 A | * | 11/2000 | Yu et al. | ........................ 525/35 |

* cited by examiner

*Primary Examiner*—Toan Ton
(74) *Attorney, Agent, or Firm*—McKenna Long & Aldridge LLP

(57) ABSTRACT

A liquid crystal display panel employing an in plane switching (IPS) mode wherein an alignment direction of a liquid crystal is moved on a plane parallel to the surface of the panel. In the panel, electrode patterns are formed on each substrate in such a manner to be opposed to each other. A liquid crystal layer is filled between the substrates provided with the electrode patterns. Alignment films are formed on each of the substrates in such a manner to be positioned between the electrode patterns and the liquid crystal layer. The alignment films allow an alignment direction of the liquid crystal layer to be changed on a plane parallel to the surfaces of the substrates by an electric field applied between the electrode patterns.

12 Claims, 2 Drawing Sheets

IN-PLANE SWITCHING MODE LIQUID CRYSTAL DISPLAY PANEL

This application claims the benefit of Korean Patent Application No. 1999-68075, filed on Dec. 31, 1999, which is hereby incorporated by reference for all purposes as if fully set forth herein.

BACKGROUND OF THE INVENTION

1. Field of the Invention

The present invention relates to a liquid crystal display panel for controlling a light transmissivity by a liquid crystal to display a picture, and more particularly to a liquid crystal display panel employing an in plane switching (IPS) mode wherein an alignment direction of a liquid crystal is moved on a plane parallel to the surface of the panel.

2. Discussion of the Related Art

Generally, liquid crystal display (LCD) panels can be largely classified into a twisted nematic (TN) mode and an in plane switching (IPS) mode. In a TN mode LCD panel, liquid crystal molecules are moved on a basis of a direction perpendicular to the panel. To this end, the TN mode LCD panel allows an electric field to be applied to a liquid crystal layer in a direction vertical or perpendicular to the surface of the panel using transparent electrodes on two glass substrates opposed to each other. Such a TN mode LCD panel can obtain sufficient brightness, but has a narrow viewing angle.

On the other hand, in the IPS mode LCD panel, liquid crystal molecules move on a plane parallel to the panel to thereby enlarge viewing angle. To this end, the IPS mode LCD panel allows a traversing electric field to be applied to the liquid crystal molecules in a direction horizontal or parallel to the panel. The IPS mode LCD panel has a drawback in that, because a pixel electrode and a common electrode exist on the same substrate to generate such a traversing electric field, transmissivity of light from a light source and aperture ratio are deteriorated. For this reason, it is difficult for the IPS mode LCD panel to obtain sufficient brightness.

As shown in FIG. 1, the IPS mode LCD panel includes an upper substrate 10 and a lower substrate 12. A first alignment film 14A is formed on the surface of the upper substrate 10. A pixel electrode pattern 16A, a common electrode pattern 16B and a second alignment film 14B are sequentially formed on the surface of the lower substrate 12. The upper substrate 10 and the lower substrate 12 are adhered to each other in such a manner that the first alignment film 14A is opposed to the second alignment film 14B. A liquid crystal layer 18 is injected between the first and second alignment films 14A and 14B. Liquid crystal molecules constituting the liquid crystal layer 18 move on a plane parallel to the lower substrate 12 in response to a traversing electric field formed by an electrifying electrode pattern on the lower substrate 12, thereby controlling light transmissivity.

As described above, in the conventional IPS mode LCD, because both the pixel electrode pattern 16A and the common electrode pattern 16B must be formed on any one of the substrates, aperture ratio of the pixel is small. For this reason, the quantity of light passing through the conventional IPS mode LCD panel is limited. As a result, the conventional IPS mode LCD panel fails to obtain sufficient brightness.

SUMMARY OF THE INVENTION

Accordingly, the present invention is directed to an in-plane switching mode liquid crystal display panel that substantially obviates one or more of the problems due to limitations and disadvantages of the related art.

An object of the present invention is to provide an in plane switching (IPS) mode liquid crystal display panel that is adaptive for enlarging viewing angle as well as obtaining sufficient brightness.

Additional features and advantages of the present invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, an in plane switching (IPS) mode liquid crystal display device includes: first and second electrodes on first and second substrates; first and second alignment films on the first and second electrodes, the first and second alignment films having a main chain and a side chain and forming an alignment direction by applying an electric field; and a liquid crystal layer between the first and second substrates.

An in plane switching mode liquid crystal display device fabricating method includes: forming first and second electrodes on first and second substrates; forming first and second alignment films on the first and second electrodes, the first and second alignment films having a main chain and a side chain and being formed an alignment direction by applying an electric field; and forming a liquid crystal layer between the first and second substrates.

It is to be understood that both the foregoing general description and the following detailed description are exemplary and explanatory and are intended to provide further explanation of the invention as claimed.

BRIEF DESCRIPTION OF THE DRAWING

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENTS

Reference will now be made in detail to the preferred embodiment of the present invention, example of which is illustrated in the accompanying drawings.

Figure 1:
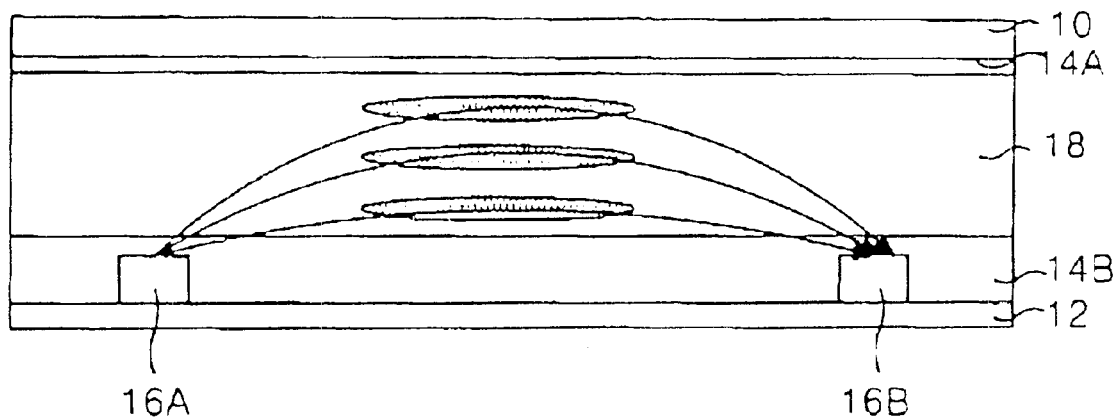
FIG. 1 is a schematic section view representing a structure of a conventional in plane switching (IPS) mode liquid crystal display (LCD) panel.
Figure 2:
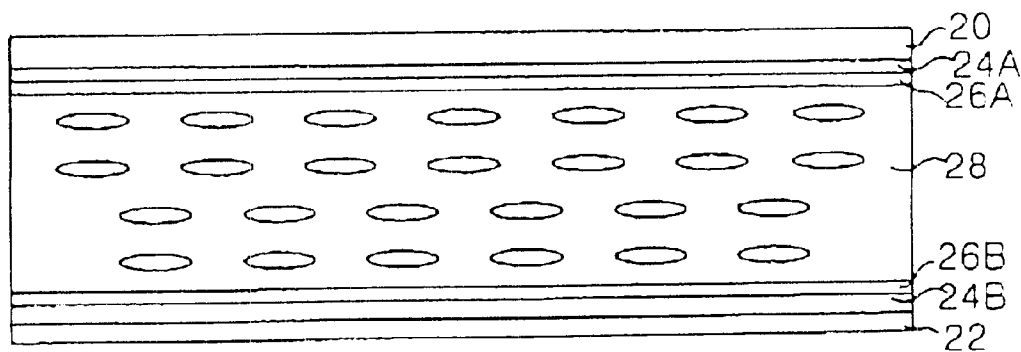
FIG. 2 is a schematic section view representing a structure of an IPS mode LCD panel according to an embodiment of the present invention.

Referring to FIG. 2, there is shown an IPS mode LCD panel according to an embodiment of the present invention. The IPS mode LCD panel includes an upper substrate 20 and a lower substrate 22 that are arranged in opposition to one another. On the surface of the upper substrate 20, a first electrode pattern 24A and a first alignment film 26A are sequentially formed. Likewise, on the surface of the lower substrate 22, a second electrode pattern 24B and a second alignment film 26B are sequentially formed. The first electrode pattern 24A has a shape of one electrode plate to cover all of the pixels in an LCD panel in a manner similar to a TN mode LCD panel. The second electrode pattern 24B also has a shape of one electrode plate to cover all of the pixels. Liquid crystal material 28 is injected between the first and second alignment films 26A and 26B.

Figure 3:
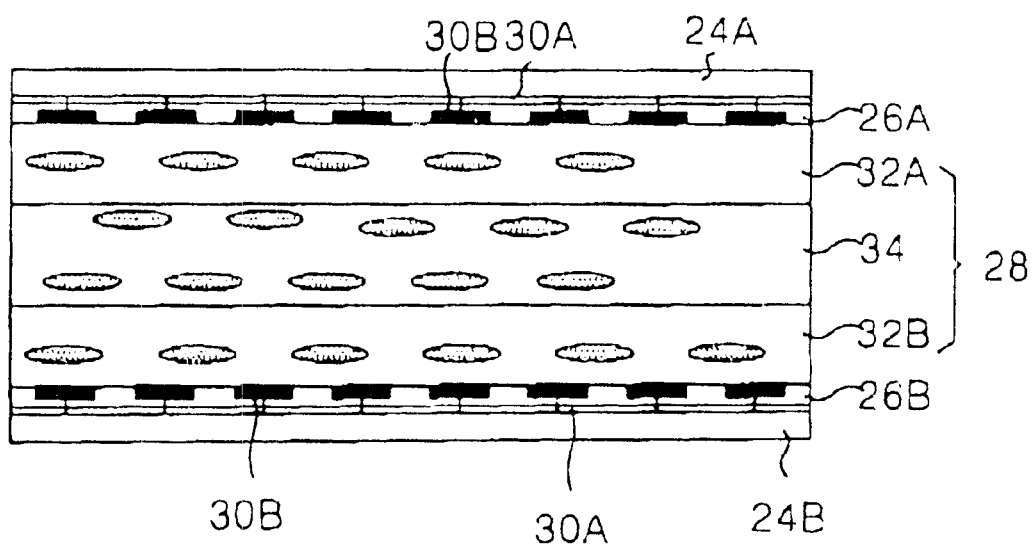
FIG. 3 is section view for explaining an operation of the LCD panel shown in FIG. 2.

The first and second alignment films 26A and 26B are made from a material having molecules re-arranged or repositioned by an electric field applied between the first and second electrode patterns 24A and 24B, i.e., an electric field in a direction perpendicular to the surface of the panel. Also, the first and second alignment films 26A and 26B must be selected from a material having a high dielectric constant, so that they can stand the majority of a voltage applied between the first and second electrode patterns 24A and 24B. For instance, the first and second alignment films 26A and 26B are made from a material having a high dielectric constant 10 to 1000 times larger than a polyimide used in conventional LCD devices. Alignment material constituting the first and second alignment films 26A and 26B is re-arranged or repositioned such that the surface layer portions of the first and second alignment films 26A and 26B adjacent to the liquid crystal layer 28, i.e., boundary portions, are provided with a main chain 30A and a side chain 30B as shown in FIG. 3. The alignment films may be formed with the ferroelectric liquid crystal polymer.

In FIG. 3, the side chain 30B of the first and second alignment films 26A and 26B takes a side branch shape extended in the side direction from the main chain 30A. Also, the structure of the side chain 30B changes in a plane direction parallel to the surfaces of the alignment films 24A and 24B in accordance with an electric field applied between the first and second electrode patterns 24A and 24B. In other words, the side chain 30B moves in a plane direction parallel to the surfaces of the alignment films 26A and 26B in accordance with the intensity of an electric field applied between the first and second electrode patterns 24A and 24B.

The liquid crystal layer 28 must be not influenced by the electric field applied between the first and second electrode patterns 24A and 24B. In other words, the liquid crystal layer 28 has a low dielectric anisotropy such that liquid crystal molecules do not move due to its dielectric anisotropy. The liquid crystal layer 28 having such a low dielectric anisotropy can be selected from any one of a positive-type nematic liquid crystal material and a negative-type nematic liquid crystal. Preferably, a negative-type nematic liquid crystal is used as the liquid crystal layer 28. Such liquid crystal molecules allow the liquid crystal layer 28 filled interposed between the alignment films 26A and 26B to be divided into first and second command layers 32A and 32B and a soldier layer 34 depending on or based on their positions.

Referring to FIG. 3, the first command layer 32A corresponds to an upper surface portion of the liquid crystal layer 28 adjacent to the first alignment film 24, while the second command layer 32B is defined by a lower surface portion of the liquid crystal layer 28 adjacent to the second alignment film 24B. When an electric field is applied between the first and second electrode patterns 24A and 24B, liquid crystal molecules included in the first command layer 32A move on a plane parallel to the surface of the first alignment film 26A by a mechanical moment of the first alignment film 26A, i.e., a motion of the side chain 30B on or at the boundary surface of the first alignment film 26A. Similarly, when an electric field is applied between the first and second electrode patterns 24A and 24B, liquid crystal molecules included in the second command layer 32B also move on a plane parallel to the surface of the second alignment film 26B by a mechanical moment of the second alignment film 26B, i.e., a motion of the side chain 30B on or at the boundary surface of the second alignment film 26B.

Figure 4:
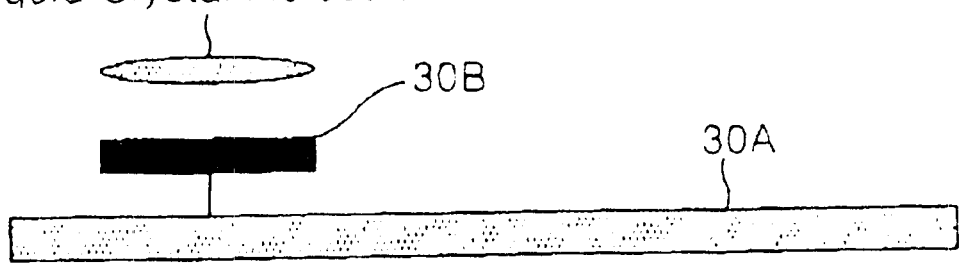
FIG. 4 is a section view for explaining driving of a command liquid crystal layer by dynamic driving of an alignment layer.

The soldier layer 34 is defined by the remaining liquid crystal layer 28 excluding the first and second command layers 32A and 32B, i.e., the upper and lower surface portions thereof. Liquid crystal molecules included in the soldier layer 34 are moved in a plane direction parallel to the surfaces of the alignment films 26A and 26B by a mechanical moment (or motion) of the liquid crystal molecules in the adjacent first or second command layer 32A or 32B. As shown in FIG. 4, a divided voltage is applied to a high dielectric alignment film by means of a electric field. To this end, the command layers 32A and 32B respond to a confirmation variation of the side chain 30B having a spontaneous polarization on a boundary surface alignment film and force the liquid crystal to be dynamically varied.

As a result, the first and second alignment films 26A and 26B change the structure of the side chain 30B on the boundary surfaces in response to an electric field applied between the first and second electrode patterns 24A and 24B, thereby sequentially moving liquid crystal molecules in the first and second command layers 32A and 32B and the soldier layer 34 in a plane direction parallel to the surfaces of the substrates 20 and 22.

As described above, the IPS mode LCD panel according to the present invention allows the alignment films to generate a mechanical moment changing in a plane direction parallel to the surface of the panel by virtue of an electric field perpendicular to the surface of the panel. Thus, an alignment direction of the liquid crystal molecules move on a plane parallel to the surface of the panel. Since the IPS mode panel can be implemented with the pixel electrode and common electrode patterns within the same substrate for applying a traversing electric field to the liquid crystal layer, it can dramatically improve an aperture ratio. As a result, the present IPS mode LCD panel is capable of enlarging viewing angle as well as obtaining sufficient brightness.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A liquid crystal display device employing an in plane switching mode, comprising:

first and second electrodes on first and second substrates;

first and second alignment films on the first and second electrodes, the first and second alignment films having a main chain and a side chain and having an alignment direction caused by an electric field; and a liquid crystal layer between the first and second substrates;

wherein the side chain has a structure that changes in a plane direction parallel to surfaces of the first and second alignment films.

2. The device of claim 1, wherein the liquid crystal layer includes a negative dielectric anisotropy constant.

3. The device of claim 1, wherein the first alignment layer includes a ferroelectric liquid crystal polymer.

4. The device of claim 1, wherein the second alignment layer includes a ferroelectric liquid crystal polymer.

5. The device of claim 1, wherein the side chain includes a spontaneous polarization.

6. The device of claim 5, wherein the liquid crystal layer forms a plane parallel to the surfaces of the first and second substrates by changing the side chain.

7. A method for fabricating a liquid crystal display device employing an in plane switching mode, comprising:

forming first and second electrodes on first and second substrates;

forming first and second alignment films on the first and second electrodes, the first and second alignment films having a main chain and a side chain and being formed in an alignment direction by applying an electric field; and forming a liquid crystal layer between the first and second substrates;

wherein the side chain has a structure that changes in a plane direction parallel to surfaces of the first and second alignment films.

8. The method of claim 7, wherein the liquid crystal layer includes a negative dielectric anisotropy constant.

9. The method of claim 7, wherein the first alignment layer includes a ferroelectric liquid crystal polymer.

10. The method of claim 7, wherein the second alignment layer includes a ferroelectric liquid crystal polymer.

11. The method of claim 7, wherein the side chain includes a spontaneous polarization.

12. The method of claim 11, wherein the liquid crystal layer forms a plane parallel to the surfaces of the first and second substrates by changing the side chain.

* * * * *